(12) United States Patent
Matsuno et al.

(10) Patent No.: US 6,418,716 B1
(45) Date of Patent: Jul. 16, 2002

(54) HYDRAULIC BRAKE BOOSTER

(75) Inventors: Isao Matsuno; Yoshinobu Mizusaki; Joichi Nakano, all of Nagano (JP)

(73) Assignee: Nissin Kogyo Co., Ltd., Nagano-Ken (JP)

( * ) Notice: Subject to any disclaimer, the term of this patent is extended or adjusted under 35 U.S.C. 154(b) by 0 days.

(21) Appl. No.: 09/855,784

(22) Filed: May 16, 2001

(30) Foreign Application Priority Data

May 17, 2000 (JP) ........................................ 2000-149837
May 17, 2000 (JP) ........................................ 2000-149838

(51) Int. Cl.[7] ............................................. B60T 13/20
(52) U.S. Cl. ........................................ 60/545; 60/555
(58) Field of Search ........................... 60/534, 545, 555, 60/556, 560, 551

(56) References Cited

U.S. PATENT DOCUMENTS 3,756,660 A * 9/1973 Burgdorf .................. 60/555 X
5,330,259 A * 7/1994 Ravndal et al. ........... 60/555 X

FOREIGN PATENT DOCUMENTS

JP 11-20663 1/1999
JP 2000-177572 6/2000

* cited by examiner

*Primary Examiner*—John E. Ryznic
(74) *Attorney, Agent, or Firm*—McGuireWoods LLP

(57) ABSTRACT

In a proportional booster valve V, a primary reaction piston 37 and a secondary reaction piston 38 are provided between a control piston 23 which faces at one end thereof toward a control pressure chamber 25 into which hydraulic pressure outputted from a primary master cylinder is inputted a boost pressure chambers 44 connected to secondary master cylinders, the primary reaction piston 37 being adapted to transmit at all times to the control piston 23 a reaction force corresponding to hydraulic pressure of the boost pressure chamber 44, the secondary reaction piston 38 being adapted to transmit to the control piston 23 a reaction force corresponding to the hydraulic pressure of the boost pressure chamber 44 as the hydraulic pressure of the boost pressure chamber 44 exceeds a set hydraulic pressure.

20 Claims, 6 Drawing Sheets

HYDRAULIC BRAKE BOOSTER

BACKGROUND OF THE INVENTION

1. Field of the Invention

The present invention relates to a hydraulic brake booster for operating wheel brakes with a magnified or boosted hydraulic pressure, and more particularly to an improvement of a hydraulic brake booster comprising a primary master cylinder for outputting a hydraulic pressure corresponding to an input from a brake pedal for the operation thereof, a hydraulic pressure source, a proportional pressure booster valve for drawing from the hydraulic pressure source a boost pressure corresponding to the hydraulic pressure outputted from the primary master cylinder for outputting and a secondary master cylinder for operating wheel brakes with a hydraulic brake pressure corresponding to the boost pressure outputted from the proportional pressure booster valve.

2. Description of the Related Art

The applicant has proposed before a hydraulic pressure booster described in JP-A-2000-177572, in which a primary master cylinder, a proportional pressure booster valve and a secondary master cylinder can be laid out individually and freely without interfering with one another, this making the hydraulic pressure booster advantageous in that the booster can easily be installed even in a limited narrow space.

In a case, however, where a tandem master cylinder is used for the primary master cylinder of the above hydraulic pressure booster, pairs of proportional pressure booster valves and secondary master cylinders are provided, respectively, in such a manner as to correspond to a pair of output ports provided in the primary master cylinder, this increasing the number of components involved in the booster, thereby making it difficult to reduce the production cost. In addition, scattering of sliding resistance of respective operating members of the pair of proportional pressure booster valves may cause a slight variation in timing at which the pair of secondary master cylinders are activated.

In addition, it is desirable for the proportional booster valve to output boost hydraulic pressure in accordance with pressure characteristics in which the pressure is drastically enhanced as if it were to jump in an initial operating stage of the primary master cylinder based on a viewpoint of eliminating a play portion from a hydraulic system extending from the proportional booster valve to the wheel brakes via the secondary master cylinders and thereafter is enhanced relatively moderately, and in order to obtain such pressure characteristics, it is considered to use as a reaction member the elastic material such as rubber used in the hydraulic booster which is disclosed in JP-A-11-20663. With the elastic material, however, since the elastic properties thereof vary depending upon temperatures, it is difficult with elastic material to obtain the aforesaid pressure characteristics in a stable fashion.

SUMMARY OF THE INVENTION

The invention was made in view of these situations, and an object thereof is to provide a hydraulic brake booster in which in addition to achieving the reduction in the number of components involved therein, a pair of secondary master cylinders can be made at all times to output hydraulic brake pressure simultaneously.

Further, another object of the invention is to provide a hydraulic brake booster which can stably obtain the hydraulic pressure characteristics in which the output from the proportional booster valve is jumped in an initial operating stage of the primary master cylinder.

With a view to attaining the object of the invention, according to a first aspect thereof, there is provided a hydraulic brake booster comprising a primary tandem master cylinder having a pair of output ports for outputting hydraulic pressure to an input to a brake pedal for the operation thereof, a hydraulic pressure source for outputting a hydraulic pressure which is higher than the hydraulic pressure outputted from the primary master cylinder, a plurality of secondary master cylinders each having an input pressure chamber and an output pressure chamber for outputting hydraulic pressure corresponding to the hydraulic pressure outputted from the input pressure chamber which is connected to wheel brakes, and a proportional pressure booster valve having a control piston facing at one end thereof a primary control pressure chamber to which one of both the output ports is connected, a free piston facing at both ends thereof a secondary control pressure chamber to which the other of both the output ports is connected and the primary control pressure chamber, respectively, and adapted to apply a direct pressing force to the control piston at the one end as the hydraulic pressure of the primary control pressure chamber decreases below the hydraulic pressure of the secondary control pressure chamber, a reaction unit for applying to the other end of the control piston a reaction force corresponding to the hydraulic pressure of a boost pressure chamber connected in common to the plurality of input pressure chambers, and a valve unit adapted to be activated as the control piston moves in an axial direction to there by draw from the hydraulic pressure source a hydraulic pressure proportional to the hydraulic pressure outputted from the primary master cylinder for introduction into the boost pressure chamber.

According to this construction, the hydraulic pressure outputted from both the output ports in the primary master cylinder which is operated by the input to the brake pedal to operate the same is applied to the ends of the free piston in the proportional pressure booster valve, and the free piston then operates such that the hydraulic pressure in the primary control pressure chamber between the control piston and the free piston balances with the hydraulic pressure in the secondary control pressure chamber which is located on the opposite side of the primary control pressure chamber and toward which the free piston faces at the one end thereof. Then, the proportional pressure booster valve outputs the boost pressure which is proportional to the hydraulic pressures of the primary and secondary control pressure chambers which balance with each other, and this hydraulic pressure so outputted from the proportional pressure booster valve then operates the plurality of secondary master cylinders, whereby the wheel brakes are applied strongly. Namely, since the plurality of secondary master cylinders are operated by virtue of the boost pressure outputted from the single common proportional pressure booster valve, the respective secondary master cylinders are always made to operate simultaneously with the boosted force without being affected by the sliding resistance that would occur on the operating members within the proportional pressure booster valve, whereby all the wheel brakes are applied simultaneously. According to this construction, the single proportional pressure booster valve suffices for the simultaneous operation of the plurality of secondary master cylinders and hence the number of components involved in the booster can be reduced, whereby the construction of the booster can be simplified, this contributing to the reduction in the production cost thereof. Moreover, even if there occurs a failure in the hydraulic system communicating with the primary control pressure chamber for some reason, the control piston can be pushed to operate directly with the hydraulic pressure in the secondary control pressure chamber, while there occurs a failure in the hydraulic system communicating with the secondary control pressure chamber for other reason, as long as the hydraulic pressure in the primary control pressure chamber remains normal, the control piston still can be pushed therewith, whereby the pressure boosting function of the proportional pressure booster valve can be maintained.

According to a second aspect of the invention, there is provided a hydraulic brake booster as set forth in the first aspect of the invention, wherein the output port of both the output ports of the primary master cylinder which is adapted to output at an earlier timing is connected to the primary control pressure chamber, and according to this construction, the hydraulic pressure outputted from the primary master cylinder is made to act on the control piston of the proportional pressure booster valve quickly, thereby making it possible to improve the response of the proportional pressure booster valve to the braking operation.

According to a third aspect of the invention, there is provided a hydraulic brake booster as set forth in the first or second aspect of the invention, wherein a small-diameter piston portion integrally provided at the one end of the control piston relatively slidably fits in the free piston which is a cylinder constructed so as to be bottomed at one end and made to open at the other end thereof which faces the control piston, and according to this construction, the control piston and the free piston are made to slide reciprocally, whereby the respective pistons can be movably supported so as to guarantee axial movements thereof with the axial length of the respective pistons being set short, thereby making it possible to contribute to the miniaturization of the proportional pressure booster valve.

According to a fourth aspect of the invention, there is provided a hydraulic brake booster as set forth in any of the first to third aspects of the invention, wherein a pair of annular seal members are mounted on an outer circumference of the free piston in such a manner as to be brought into a sliding contact with a housing in which the free piston slidably fits, and wherein a drain passage is formed in the housing for opening to the atmospheric pressure at a portion between the seal members, and according to this construction, not only can the driver of the vehicle be let known that there is occurring something abnormal in the seal on the outer circumference of the free piston, but also a risk attributable to the abnormality can be avoided in which the whole hydraulic brake circuit is reduced to a single hydraulic system. Namely, in the event that one of the two annular seal members fails for some reason, the hydraulic pressure in the hydraulic system connecting to the control pressure chamber associated with the annular seal member so failing is released to the atmospheric pressure, this increasing the operation stroke in the primary master cylinder, whereby the driver can be made to recognize that a certain failure is happening in the hydraulic brake systems. In addition, despite the drop in hydraulic pressure in one of the two pressure control chambers, the control piston is still able to be pushed on, and therefore, the boosting function can still be provided. In contrast to this, in a case where an only one annular seal member is mounted around the outer circumference of the free piston, in the event that the single annular seal member gets abnormal, the whole hydraulic brake circuit is reduced to a single hydraulic system, and should a hydraulic failure occur in either of the hydraulic systems, no counter measures can be taken.

According to a fifth aspect of the invention, there is provided a hydraulic brake booster comprising: a primary master cylinder for outputting hydraulic pressure in response to an input applied to a brake pedal for the operation thereof; a hydraulic pressure source for outputting a hydraulic pressure which is higher than the hydraulic pressure outputted from the primary master cylinder; secondary master cylinders each having an input pressure chamber and an output pressure chamber connected to wheel brakes for outputting hydraulic pressure corresponding to the hydraulic pressure of the input pressure chamber; and a proportional booster valve having a control piston facing at one end thereof toward a control pressure chamber into which the hydraulic pressure outputted from the primary master cylinder is inputted, a primary reaction piston for transmitting at all times to the control piston a reaction force corresponding to hydraulic pressure of a boost pressure chamber connected to the input pressure chamber, a secondary reaction piston for transmitting to the control piston a reaction force corresponding to the hydraulic pressure of the boost pressure chamber as the hydraulic pressure of the boost pressure chamber exceeds a set hydraulic pressure, and valve unit adapted to be activated as the control piston moves in an axial direction so as to draw from the hydraulic pressure source a hydraulic pressure proportional to the hydraulic pressure of the control pressure chamber for introduction into the boost pressure chamber.

According to this construction, the proportional booster valve output the boost pressure proportional to the hydraulic pressure outputted from the output ports of the primary master cylinder adapted to be activated by an input applied to the brake pedal to operate the same, and the secondary master cylinders are activated by virtue of the hydraulic pressure outputted from the proportional booster valve, where by the wheel brakes can be activated strongly, the brakes being then applied. In addition, in the proportional booster valve, in the initial operating stage of the primary master cylinder, the hydraulic pressure of the boost pressure chamber is applied to the control piston as a reaction force by only the primary reaction piston, and once the hydraulic pressure of the boost pressure chamber exceeds the set hydraulic pressure, the hydraulic pressure of the boost pressure chamber is applied to the control piston as the reaction force by both the primary and secondary reaction pistons, and therefore, the output from the proportional booster valve can be made to jump in the initial operating stage of the primary master cylinder, and moreover, the variation in the pressure characteristics due to temperatures can be avoided to thereby obtain stable pressure characteristics at all times.

According to a sixth aspect of the invention, there is provided a hydraulic brake booster as set forth in the fifth aspect of the invention, wherein the primary reaction piston fits in the secondary reaction piston fluid tightly and relatively slidably, the primary reaction piston being connected to the control piston at one end thereof and facing at the other end thereof toward the boost pressure chamber, the secondary reaction piston having formed at one end thereof an abutment face adapted to be brought into abutment with the primary reaction piston in such a manner as to face the primary reaction piston. According to this construction, despite the primary and secondary reaction pistons being disposed, the increase in the length of the proportional booster valve along an axial direction of the reaction pistons can be suppressed.

According to a seventh aspect of the invention, there is provided a hydraulic brake booster comprising: a primary master cylinder for outputting hydraulic pressure in response to an input applied to a brake pedal for the operation thereof;

a hydraulic pressure source connected to a reservoir for outputting a hydraulic pressure higher than a hydraulic pressure outputted from the primary master cylinder irrespective of the operation of the brake pedal; secondary master cylinders each having an input pressure chamber and an output pressure chamber for outputting a hydraulic pressure corresponding to the hydraulic pressure of the input pressure chamber; a pressure regulator valve unit each provided between the output pressure chamber and a wheel brake for regulating the hydraulic pressure of the output pressure chamber; proportional pressure booster valves each having a control piston receiving at one end thereof a hydraulic pressure of a control pressure chamber into which the hydraulic pressure outputted from the primary master cylinder (M1) is inputted, a reaction unit for applying to the other end of the control piston a reaction force corresponding to a hydraulic pressure of a boost pressure chamber connected to the input pressure chamber, an inlet valve interposed between the boost pressure chamber and the hydraulic pressure source such that the inlet valve opens as the control piston moves toward a side where the capacity of the boost pressure chamber is reduced in response to a change in hydraulic pressure of the control pressure chamber and an outlet valve interposed between the boost pressure chamber and the reservoir such that the outlet valve closes as the control piston moves toward the side where the capacity of the boost pressure chamber is reduced for drawing a hydraulic pressure proportional to the hydraulic pressure of the control pressure chamber from the boost pressure chamber; a primary closing valve interposed between the hydraulic pressure source and the input pressure chamber; and a secondary closing valve provided at an intermediate position along a path extending from the input pressure chamber as far as the reservoir via the booster pressure chamber and the outlet valve such that the secondary closing valve opens when the primary closing valve closes, while the secondary closing valve closes when the primary closing valve opens.

According to this construction, when the primary master cylinder is activated by the driver of a vehicle who operates the brake pedal, the proportional booster valves output hydraulic pressure proportional to the hydraulic pressure outputted by the primary master cylinder. The hydraulic pressure so outputted from the proportional booster valves then activates the secondary master cylinders, whereby the wheel brakes are applied strongly. Moreover, the brake pressure at the wheel brakes can be controlled by regulating hydraulic pressure with the pressure regulator valve unit, so that the brake pressure control as in a case where the anti-lock braking system is activated on braking can be attained. In addition, the hydraulic pressure outputted from the hydraulic pressure source can be introduced into the input pressure chambers of the secondary master cylinders by opening the primary closing valves, whereby a braking assisting control and an emergency braking control can be effected quickly and properly. Moreover, the exertion of an excessive reaction force from the reaction unit to the control pistons is prevented which occurs as a high hydraulic pressure is introduced from the input pressure chambers of the secondary master cylinders into the boost pressure chambers of the proportional booster valves by closing the secondary closing valves while the primary closing valves are open. Additionally, even with the outlet valves being left open, the escape of the hydraulic pressure outputted from the hydraulic pressure source to the reservoir via the boost pressure chambers and outlet valves can be prevented.

In addition, according to an eighth aspect of the invention, there is provided a hydraulic brake booster as set forth in the first aspect of the invention, wherein the secondary closing valves are interposed between the boost pressure chambers and the input pressure chambers. According to this construction, a differential pressure between the hydraulic pressure in the hydraulic pressure source and the hydraulic pressure in the proportional booster valves is applied to valve bodies of the secondary closing valves in a valve opening direction when the secondary closing valves are open, and this helps reduce a force required to close the secondary closing valve, contributing to the miniaturization of the secondary closing valves.

According to a ninth aspect of the invention, there is provided a hydraulic brake booster as set forth in the seventh aspect of the invention, wherein a single number of the primary and secondary closing valves is provided, respectively, for the plurality of secondary master cylinders and the single hydraulic pressure source. According to this construction, even if there are provided the plurality of secondary master cylinders, only the single number of the primary and secondary closing valves may be required, this preventing the number of components from being increased.

According to a tenth aspect of the invention, there is provided a hydraulic brake booster as set forth in any of the seventh to ninth aspects of the invention, wherein the primary and secondary closing valves can be closed independently of the operation of the primary master cylinder. According to this construction, the secondary master cylinders can be activated independently of the operation of the primary master cylinder, whereby a stability control during a turn and automatic braking for keeping a proper distance between two vehicles running in succession can be performed.

According to an eleventh aspect of the invention, there is provided a hydraulic brake booster as set forth in the tenth aspect of the invention, including a detecting unit for detecting the operation of the primary master cylinder and a control unit (16) for controlling the primary and secondary closing valves such that the primary closing valve closes, while the secondary closing valve closes when the detecting unit detects the operation of the primary master cylinder in a state in which the primary closing valve are open, while the secondary closing valve are closed. According to this construction, when the driver performs a braking operation which activates the primary master cylinder while automatic braking in operation, a state can be restored in which the hydraulic pressure outputted from the proportional booster valves is applied to the secondary master cylinders.

DETAILED DESCRIPTION OF THE PREFERRED EMBODIDMENTS

Figure 1:
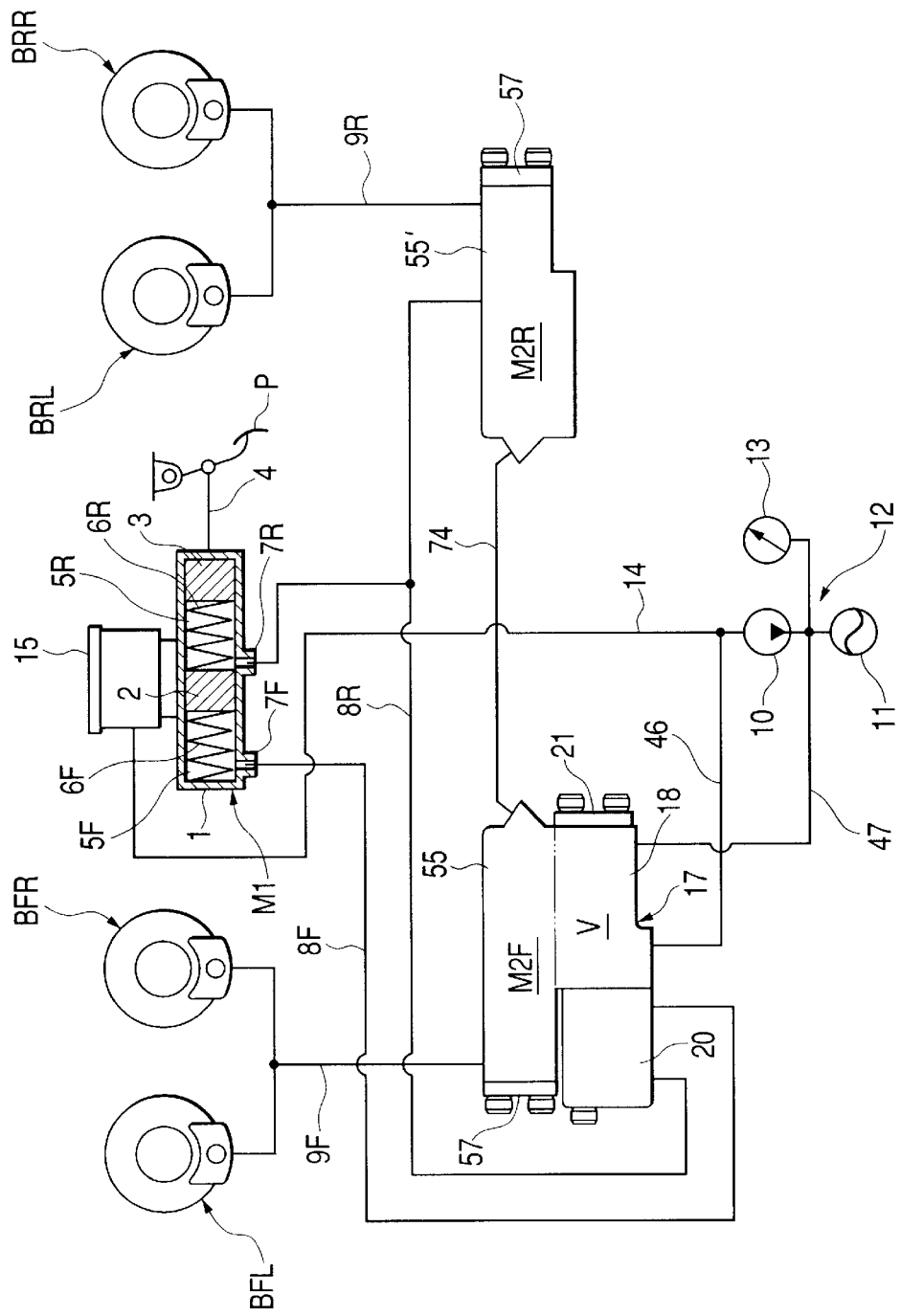
FIG. 1 is a hydraulic circuit diagram of a hydraulic brake booster according to a first embodiment of the invention.

A mode for carrying out the invention will be described below based on an embodiment of the invention illustrated in the accompanying drawings.

FIGS. 1 to 4 show a first embodiment of the invention. First of all, referring to FIG. 1, a primary master cylinder M1 is a master cylinder of tandem type comprising a cylinder body 1, a front piston 2 and a rear piston 3, the front and rear pistons being fittingly and slidably mounted in the cylinder body 1. A brake pedal P is connected to the rear piston 3 via an input rod 4.

Formed in the cylinder body 1 area front hydraulic chamber 5F toward which a front end of the front piston 2 faces and a rear hydraulic chamber 5R between the front and rear pistons 2, 3. Received, respectively, in the front and rear hydraulic chambers 5F, 5R are return springs 6F, 6R for biasing the respective pistons 2, 3 in a rearward direction, and the set load of the front return spring 6F is set smaller in magnitude than that of the rear return spring 6R. In addition, formed in the cylinder body 1 are front output port 7F communicating with the front hydraulic chamber 5F and a rear output port 7R communicating with the rear hydraulic chamber 5R.

In the primary master cylinder M1 constructed as described above, when depressing force is applied to the brake pedal P, and pushing the rear piston 3 forward, the front return spring 6F is first compressed to generate hydraulic pressure in the front hydraulic chamber 5F, and then, the rear return spring 6R is compressed when the hydraulic pressure in the front hydraulic chamber 5F reaches a predetermined value, this generating hydraulic pressure in the rear hydraulic chamber 5R. Namely, in this master cylinder M1, the hydraulic pressure is first outputted from the front output port 7F, and thereafter, the hydraulic pressure is outputted from the rear output port 7R at a delayed timing.

The front output port 7F is connected to a proportional pressure booster valve V via a front hydraulic path 8F, and a front secondary master cylinder M2F is provided in parallel with the proportional pressure booster valve V. The front secondary master cylinder M2F is adapted to be activated when receiving hydraulic pressure outputted from the proportional pressure booster valve V. Additionally, the rear output port 7R is also connected to the proportional pressure booster valve V via a rear hydraulic path 8R, and a rear secondary master cylinder M2R is disposed away from the proportional pressure booster valve V. The rear secondary master cylinder M2R is adapted to be activated when receiving hydraulic pressure outputted from the proportional pressure booster valve V.

A pair of front wheel brakes BFL, BFR for braking left and right front wheels is connected to a front output path 9F extending from the front secondary master cylinder M2F, while a pair of left and right rear wheel brakes BRL, BRR for braking left and right rear brakes is connected to a rear output path 9R extending from the rear secondary master cylinder M2R.

A hydraulic pressure source 12 is connected to the proportional pressure booster valve V. The hydraulic pressure source 12 comprises a hydraulic pump 10 adapted to be driven by an electric motor (not shown) and an accumulator 11 for accumulating hydraulic pressure discharged by the hydraulic pump 10. The hydraulic pressure of the accumulator 11 is detected by a hydraulic pressure sensor 13, and when the detected pressure decreases to or below a lower limit value, the hydraulic pump 10 is activated, while the detected pressure increases to or over an upper limit value, the hydraulic pump 10 is stopped.

An intake side of the hydraulic pump 10 is connected to a reservoir 15 of the primary master cylinder M1 via an intake path 14. Namely, the hydraulic pressure source 12 is intended to draw brake fluid from the reservoir 15, is able to output a hydraulic pressure higher than the hydraulic pressure outputted from the primary master cylinder M1 irrespective of an braking operation, and is connected to the proportional pressure booster valve V.

Figure 2:
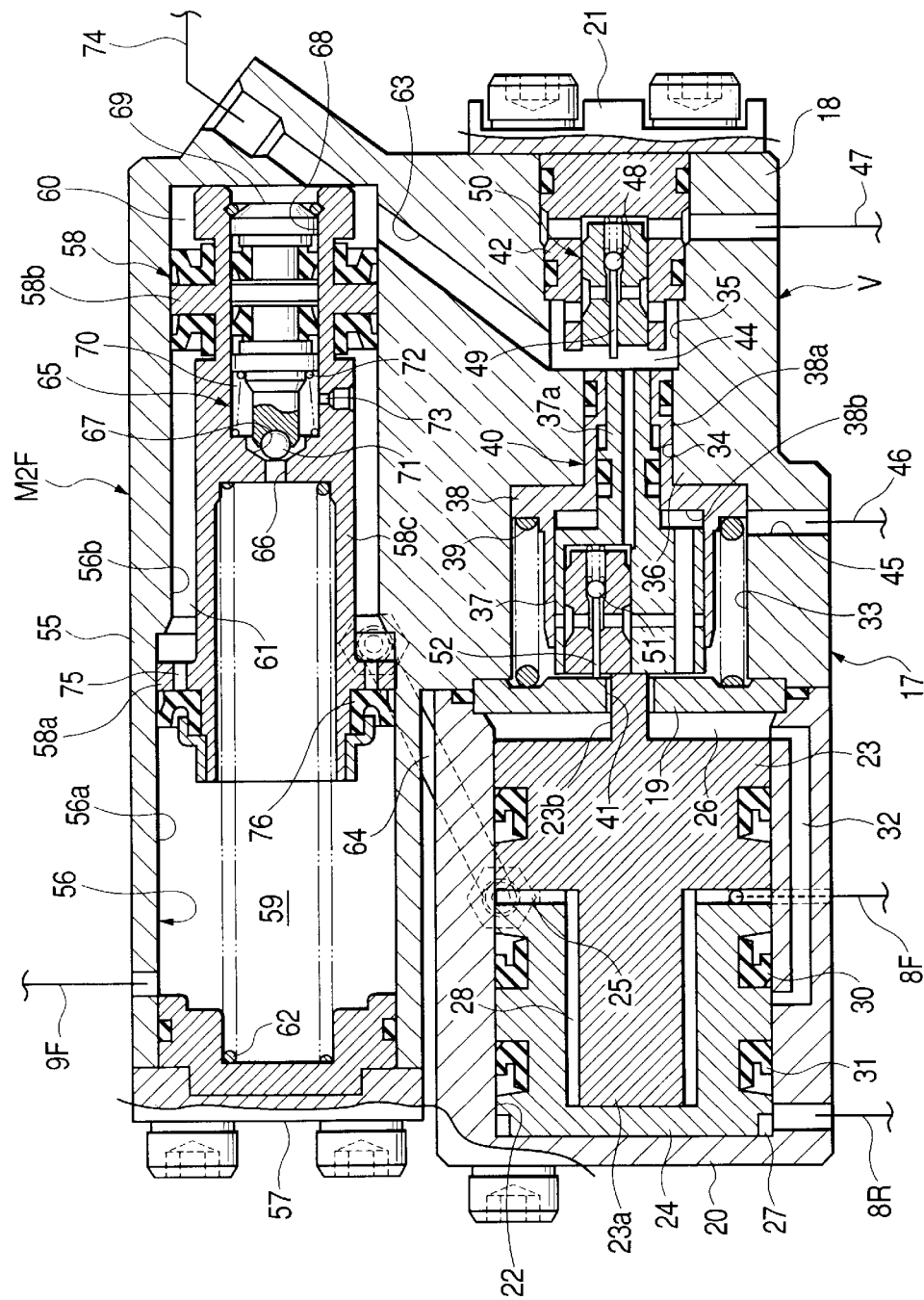
FIG. 2 is a longitudinal cross-sectional view showing the constructions of a proportional pressure booster valve and a front secondary master cylinder according to the first embodiment.

In FIG. 2, a housing 17 for the proportional pressure booster valve V comprises a housing main portion 18, a bottomed cylindrical cap 20 joined to one end of the housing main portion 18 via a partition plate 19 which is held between the cap and the housing main portion, and a lit plate 21 joined to the other end of the housing main portion 18.

In the cap 20, there is formed a bottomed cylinder hole 22, an opening end of which is closed by the partition plate 19. A control piston 23 and a free piston 24 are fittingly and slidably mounted in the cylinder hole 22. The free piston 24 is able to slide relative to the control piston 23 in axial directions.

The control piston 23 faces at one end thereof toward a primary control pressure chamber 25 formed in the cylinder hole 22 between the control piston 23 itself and the free piston 24 and at the other end toward an atmospheric pressure chamber 26 which faces toward the partition plate 19, and is fittingly and slidably mounted in the cylinder hole 22. The free piston 24 forms a secondary control pressure chamber 27 between the free piston 24 itself and the closed end of the cap 20, and is fittingly and slidably mounted in the cylinder hole 22, as well, this allowing the free piston 24 to face toward the secondary control pressure chamber 27 and the primary control pressure chamber 25 at ends thereof, respectively.

The free piston 24 is formed into a bottomed cylindrical shape which is made to open at an end thereof which faces toward the control piston 23. A small-diameter piston portion 23a is integrally provided on one end of the control piston 23, the small-diameter piston portion 23a being constructed so as to fit in the free piston 24 relatively slidably. Moreover, a plurality of grooves 28, ... are formed in an outer circumference of the small-diameter piston portion 23 a for smoothly introducing brake fluid between the free piston 24 and the small-diameter piston portion 23a.

Thus, the free piston 24 operates so that the hydraulic pressures in the first and secondary control pressure chambers 25, 27 balance with each other, and as the hydraulic pressure in the primary control pressure chamber 25 decreases below that of the secondary control pressure chamber 27, the pressing force is designed to be directly applied from the free piston 24 to the one end of the control piston 23.

One of the pair of output ports 7F, 7R formed in the primary master cylinder M1 which outputs at an earlier timing, that is, the front output port 7F, is connected to the primary control pressure chamber 25 via the front hydraulic path 8F. Further, the remaining output port of the pair of output ports 7F, 7R formed in the primary master cylinder M1, that is, the rear output port 7R, is connected to the secondary control pressure chamber 27 via the rear hydraulic path 8R.

Lip seals 30, 31 which are a pair of annular seal members adapted to be brought into a sliding contact with the cap 20 constituting a part of the housing 17 are mounted on an outer circumference of the free piston 24. In addition, a drain passage 32 is formed in the cap 20 in such a manner as to open at one end thereof in an inner surface of the cylinder hole 22 to thereby communicate with a portion between the two lip seals 30, 31 at all times and communicate at the other end thereof with the atmospheric pressure chamber 26. In other words, the portion between the two seal lips 30, 31 is made to open to the atmospheric pressure.

Formed in the housing main portion 18 are a receiving hole 33 which is closed at one end with the partition plate 19 and a mounting hole 35 which is formed eccentric to the receiving hole 33. The receiving hole 33 and the mounting hole 35 are disposed to interpose a partition wall 36 therebetween. Further, the mounting hole 35 is closed with the lid plate 21 at an open end thereof which is opposite to the partition wall 36. Moreover, the mounting hole 35 is formed at the position eccentric to the receiving hole 33 so as to increase a diameter thereof in a stepped fashion as the mounting hole 35 extends away from the partition wall 36. In addition, a sliding hole 34 is formed in the partition wall 36 concentrically with the receiving hole 33 for connecting the receiving hole 33 and the mounting hole 35.

A primary reaction piston 37 is received in the receiving hole 33 in such a manner as to move in axial directions, and a secondary reaction piston 38 constituting a reaction unit 40 in cooperation with the primary reaction piston 37 is also slidably fitted in the receiving hole 33 in such a manner as to slide relative to the primary reaction piston 37. A reaction spring 39 is provided between the partition plate 19 and the secondary reaction piston 38 for exhibiting spring force for biasing the secondary reaction piston 38 toward the partition wall 36 side.

A proximal end of a small-diameter portion 38a is provided concentrically and integrally continuously on the secondary reaction piston 38, the small-diameter portion 38a being formed into a cylindrical shape so as to slidably fit in the sliding hole 34. In addition, a proximal end of a small-diameter portion 37a is concentrically and integrally continuously provided on the primary reaction piston 37, the small-diameter portion 37a being formed into a cylindrical shape so as to slidably fit in the small-diameter portion 38a of the secondary reaction piston 38. Moreover, an abutment face 38b is formed on the secondary reaction piston 38 in such a manner as to face toward one end of the primary reaction piston 37 so that the abutment face is brought into abutment with the primary reaction piston 37, whereby the primary reaction piston 37 is fitted in the secondary reaction piston 38 fluid tightly and relatively slidably.

On the other hand, a small shaft 23b is integrally provided on the control piston 23 in such a manner as to pass through a through hole 41 formed in a central portion of the partition plate 19 and abut against an end face of the primary reaction piston 37 which is opposite to the end thereof where the small-diameter portion 37a is provided. The control piston 23 can push the primary reaction piston 37 via the small shaft 23b.

A valve housing 42 is fixedly mounted in the mounting hole 35, whereby a boost pressure chamber 44 is defined within the mounting hole 35 between the partition wall 36 and the valve housing 42. Thus, a distal end of the small-diameter portion 37a of the primary reaction piston 37 and a distal end of the small-diameter portion 38a of the secondary reaction piston 38 are both constructed so as to face toward the boost pressure chamber 44, whereby the primary reaction piston 37 transmits at all times a reaction force corresponding to the hydraulic pressure of the boost pressure chamber 44 to the control piston 23, while the secondary reaction piston 38 is to transmit a reaction force corresponding to the hydraulic pressure of the boost pressure chamber 44 to the control piston 23 in accordance that the hydraulic pressure of the boost pressure chamber 44 exceeds a set hydraulic pressure determined by the reaction spring 39.

An open port 45 is formed so as to open in an inner surface of the cylinder hole 33 in the cylinder main portion 18, and a return path 46 communicating with the open port 45 is connected to the intake path 14. Thus, respective portions in the cylinder hole 33 which communicate with the atmospheric pressure chamber 26 via the through hole 41 are connected to the reservoir 15.

In the valve housing 42, there is provided an inlet valve 48 for opening and/or closing between a hydraulic path 47 extending from the accumulator 11 of the hydraulic pressure source 12 and the boost pressure chamber 44. This inlet valve 48 has a valve opening rod 49 which is pushed on by the distal end of the small-diameter portion 37a provided on the primary reaction piston 37, and the valve 48 opens and/or closes in accordance with the operation of the control piston 23 since the primary reaction piston 37 operates together with the control piston 23. Namely, as the control piston 23 moves to a side where the capacity of the boost pressure chamber 44 is reduced, the valve opening rod 49 is pushed on by the primary reaction piston 37, so as to open the inlet valve 48. Accordingly, a communication is provided between the hydraulic path 47, that is, the hydraulic pressure source 12 and the boost pressure chamber 44, whereas as the control piston 23 moves to the other side where the capacity of the boost pressure chamber 44 is increased, the inlet valve 48 is closed.

An outlet valve 51 constituting a valve unit 50 in cooperation with the inlet valve 48 is provided on the primary reaction piston 37 for establishing and/or blocking a communication between the cylinder hole 33 communicating with the reservoir 15 and the boost pressure chamber 44. This outlet valve 51 has a valve opening rod 52 which is allowed to abut against the partition plate 19 and opens and/or closes in accordance with the operation of the control piston 23. Namely, as the control piston 23 moves to the side where the capacity of the boost pressure chamber 44 is reduced, the primary reaction piston 37 moves away from the partition plate 19, whereby the outlet valve 51 is closed. On the other hand, as the control piston 23 moves to the other side where the capacity of the boost pressure chamber 44 is increased, the primary reaction piston 37 retreats so as to approach the partition plate 19. Then, the valve opening rod 52 is pushed on by the partition plate 19 to open the outlet valve 51, whereby a communication is established between the boost pressure chamber 44 and the reservoir 15.

The front secondary master cylinder M2F comprises a cylinder body 55 formed integrally with the housing main portion 18 of the proportional pressure booster valve V and an end plate 57 fastened to the cylinder body 55 so as to close an open end of a bottomed cylinder hole 56 formed in the cylinder body 55.

The cylinder hole 56 is formed into a stepped fashion so as to have a large-diameter hole portion 56a closed at one end thereof with the end plate 57 and a small-diameter hole portion 56b which is concentric and continuous with the other end of the large-diameter hole portion 56a at one end and is closed with an end wall of the cylinder hole 56 at the other end thereof. A working piston 58 slidably fits in the cylinder hole 56, and the working piston 58 comprises integrally a large-diameter piston portion 58a, a small-diameter piston portion 58b and a connecting shaft portion

58c. The large-diameter piston portion 58a is slidably fitted in the large-diameter hole portion 56a to form an output pressure chamber 59 in cooperation with a closed portion at the end of the large-diameter hole portion 56a. The small-diameter piston portion 58b is slidably fitted in the small-diameter hole portion 56b to form a primary input pressure chamber 60 in cooperation with a closed portion at the other end of the small-diameter hole portion 56b. The connecting shaft portion 58c is connected between the large-diameter piston portion 58a and the small-diameter piston portion 58b to form a secondary annular input pressure chamber 61 in cooperation with an inner surface of the cylinder hole 56.

A front output path 9F connecting to the front wheel brakes BFL, BFR is connected to the output pressure chamber 59. A return spring 62 is accommodated in the output pressure chamber 59 for biasing the working piston 58 on a side where the capacity of the output pressure chamber 59 is increased or the capacity of the primary input pressure chamber 60 is decreased.

A communicating path 63 is formed in the housing main portion 18 of the proportional pressure booster valve V and the cylinder body 55 of the front secondary master cylinder M2F for allowing the boost pressure chamber 44 of the proportional pressure booster valve V to communicate with the primary input pressure chamber 60 of the front secondary master cylinder M2F. Thus, a boost pressure outputted from the proportional pressure booster valve V is applied to the primary input pressure chamber 60 of the front secondary master cylinder M2F.

Additionally, the primary control pressure chamber 25 of the proportional pressure booster valve V is connected to the secondary input pressure chamber 61 via a communicating path 64. Thus, hydraulic pressure outputted from the front output port 7F in the primary master cylinder M1 is allowed to be applied to the secondary input pressure chamber 61 via the primary control pressure chamber 25 and the communicating path 64.

A cut valve 65 is provided in the working piston 58 for cutting off between the primary master cylinder M1 and the front wheel brakes BFL, BFR as the hydraulic pressure outputted from the proportional pressure booster valve V or the hydraulic pressure of the primary input pressure chamber 60 increases.

The cut valve 65 comprises a valve hole 66, a sliding hole 68, a valve piston 69, a spherical valve body 71 and a valve spring 72. The valve hole 66 communicates with the output pressure chamber 59 and is provided at a central portion of the working piston 58. The sliding hole 68 is formed concentrically with the working piston 58 in such a manner that a valve seat 67 is formed at an inner end of the sliding hole 68, while an outer end is made to open to the primary input pressure chamber 60. The valve seat 67 allows the valve hole 66 to open in a central portion thereof. The valve piston 69 is slidably fitted in the sliding hole 68 in such a manner as to face toward the primary input pressure chamber 60 at an outer end thereof while forming a valve chamber 70 in cooperation with the valve seat 67. The spherical valve body 71 is adapted to be seated on the valve seat 67 and securely fixed to an inner end of the valve piston 69. The valve spring 72 is received in the valve chamber 70 for exhibiting a spring force biasing the valve piston 69 in a direction in which the valve body 71 moves away from the valve seat 67.

Moreover, an orifice 73 for throttling the passage of brake fluid is provided in the working piston 58 in such a manner as to be interposed between the primary master cylinder M1 and the valve chamber 70 of the cut valve 65 or, in this embodiment, between the secondary input pressure chamber 61 and the valve chamber 70, and the valve chamber 70 is allowed to communicate with the secondary input pressure chamber 61 via the orifice 73.

According to the cut valve 65 described above, as the hydraulic pressure outputted from the proportional pressure booster valve V is applied to the primary input pressure chamber 60 in response to the operation of the primary master cylinder M1, the cut valve 65 closes to thereby cut off the communication between the secondary input pressure chamber 61 and the output pressure chamber 59. Moreover, the set loads of the return spring 62 for biasing the working piston 58 and the valve spring 72 are set such that the cut valve 65 closes before the working piston 58 is moved to a side where the capacity of the output pressure chamber 59 is reduced by virtue of the hydraulic pressure of the primary input pressure chamber 60.

While the cut valve 65 remains open, the front wheel brakes BFL, BFR are allowed to communicate with the primary master cylinder M1 via the output path 9F, the output pressure chamber 59 of the front secondary master cylinder M2F, the valve chamber 70 of the cut valve 65, the orifice 73, the secondary input pressure chamber 61, the communicating path 64, the primary control pressure chamber 25 of the proportional pressure booster valve V and the front hydraulic path 8F. Further, the rear wheel brakes BRL, BRR are allowed to communicate with the primary master cylinder M1 via an output path 9R, the output pressure chamber 59 of the rear secondary master cylinder M2R, the valve chamber 70 of the cut valve 65, the orifice 73, the secondary input pressure chamber 61 and the rear hydraulic path 8R. This allows the primary master cylinder M1 to absorb changes in volume of the front and rear wheel brakes BFL, BFR, BRL, BRR resulting from a change in temperature of the brake fluid.

A plurality of communicating holes 75 . . . are formed in the large-diameter piston portion 58a of the working piston 58 in such a manner as to communicate with the secondary input pressure chamber 61. A lip seal 76, which faces toward the communicating holes 75 . . . on the back thereof, is mounted on the large-diameter piston portion 58a such that brake fluid is permitted to flow from the secondary input pressure chamber 61 into the output pressure chamber 59 when the hydraulic pressure in the output pressure chamber 59 decreases lower than that in the secondary input pressure chamber 61.

Figure 3:
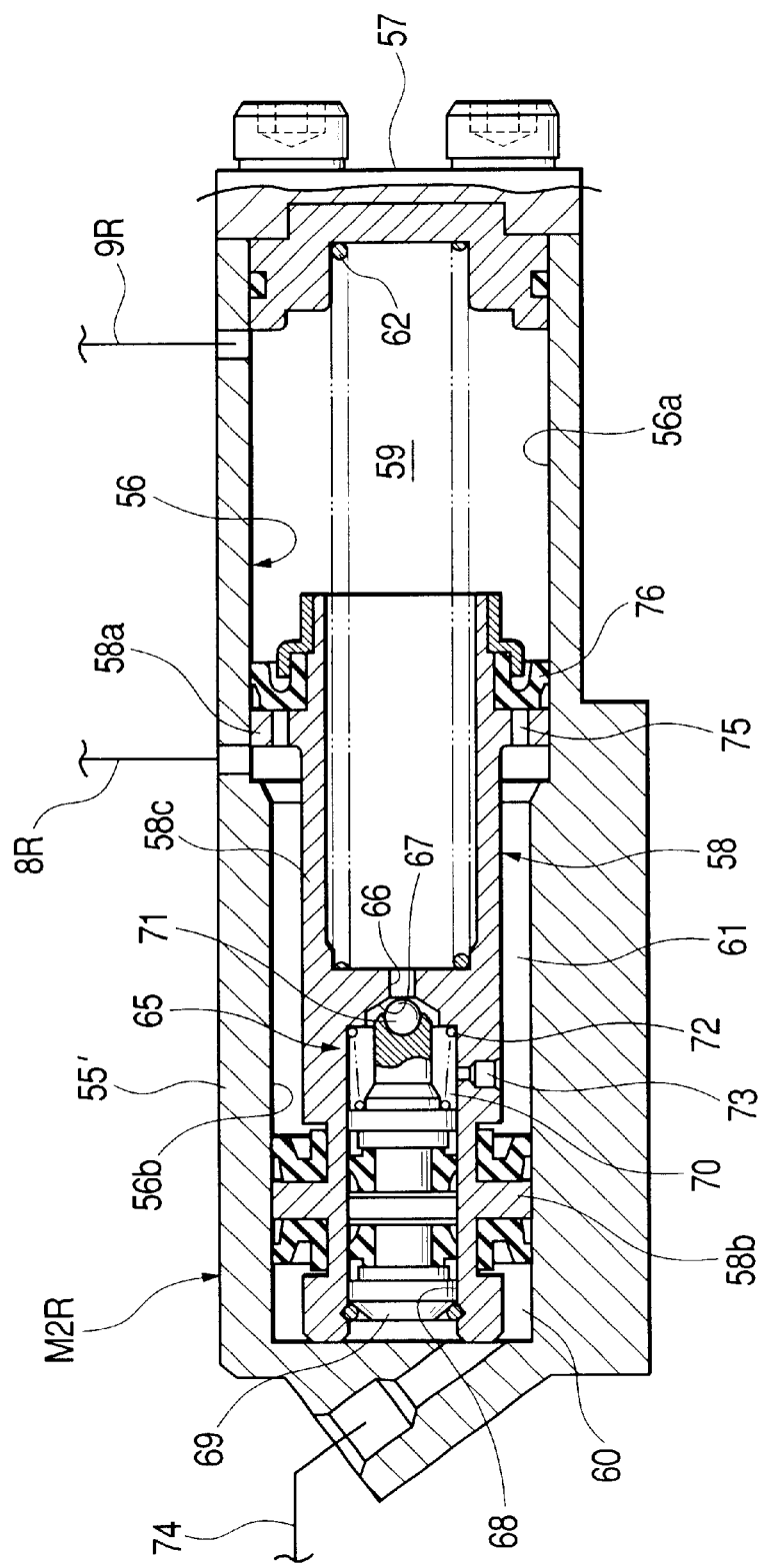
FIG. 3 is a longitudinal cross-sectional view of a rear secondary master cylinder according to the first embodiment.

In FIG. 3, the rear secondary master cylinder M2R is basically constructed identical with the front secondary master cylinder M2F except that a cylinder body 55' 0thereof is independent from the housing main portion 18 of the proportional pressure booster valve V, that a primary input pressure chamber 60 is allowed to communicate with the primary input pressure chamber 60 of the front secondary master cylinder M2F via a communication line 74, and that a rear output path 9R communicating with the rear wheel brakes BRL, BRR is connected to an output pressure chamber 59, with like reference numerals being given to portions corresponding to those of the front secondary master cylinder M2F, and therefore a detailed description of the rear secondary master cylinder M2R will be omitted here.

Next, the operation of this embodiment will be described. The hydraulic pressure outputted from the two output ports 7F, 7R of the primary master cylinder M1 which is activated by an input applied to the brake pedal acts on the ends of the free piston 24 in the proportional pressure booster valve V. Thus, the free piston 24 operates such that the hydraulic pressure in the primary control pressure chamber 25 between the control piston 23 and the free piston 24 balances with the hydraulic pressure in the secondary control pressure chamber 27 which is located opposite to the primary control pressure chamber 25 and toward which the end face of the free piston faces, and a pressing force is applied to the control piston 23 which corresponds to the hydraulic pressures in the primary and secondary control pressure chambers 25, 27 which balance with each other.

On the other hand, the hydraulic pressure in the boost pressure chamber 44 is transmitted to the control piston 23 by the reaction unit 40, and the hydraulic pressure in the pressure source 12 is drawn into the boost pressure chamber 44 by the valve unit 50 corresponding to the axial movement of the control piston 23 in response to the hydraulic pressure of the primary control pressure chamber 25, and a boost pressure is outputted from the boost pressure chamber 44 which is proportional to the pressing force acting on the control piston 23 or the aforesaid balanced hydraulic pressure.

The hydraulic pressure outputted from the proportional pressure booster valve V then activates the front and rear secondary master cylinders M2F, M2R, whereby the respective wheel brakes BFL, BFR, BRL, BRR can be applied strongly. Moreover, since the pair of secondary master cylinders M2F, M2R are allowed to operate by virtue of the boost pressure outputted from the single common proportional pressure booster valve V, the respective secondary master cylinders M2F, M2R are activated to operate simultaneously at all times without being affected by the sliding resistance of the working members within the proportional pressure booster valve V so that all the wheel brakes BFL, BFR, BRL, BRR can be activated to operate simultaneously. This allows the single proportional pressure booster valve V to suffice for the aforesaid brake operation, whereby the number of components used in the booster can be reduced, this leading to the simple construction, which contributes to reduction in production cost.

In addition, the free piston 24, facing toward the primary control pressure chamber 25 and the secondary control pressure chamber 27 at the ends thereof, respectively, can apply the pressing force directly to the end of the control piston 23, when the hydraulic pressure in the primary control pressure chamber 25 decreases lower than that in the secondary control pressure chamber 27. Therefore, even in the event that a hydraulic failure occurs somewhere along the hydraulic system providing a communication with the primary control pressure chamber 25 for some reason, the control piston 23 is still pressed on by the free piston 24 based on the hydraulic pressure in the secondary control pressure chamber 27. In contrast to this, even in the event that a hydraulic failure occurs somewhere along the hydraulic system providing a communication with the secondary control pressure chamber 27 for some reason, as long as the hydraulic pressure in the primary control pressure chamber 25 remains normal, the control piston 23 can still be pushed on, there by making it possible to maintain the pressure boosting function of the proportional pressure booster valve V.

Additionally, since the output port 7F of the two output ports 7F, 7R of the primary master cylinder M1 which outputs at an earlier timing is connected to the primary control pressure chamber 25, the hydraulic pressure outputted from the primary master cylinder M1 is allowed to be applied to the control piston 23 without any delay, thereby making it possible to improve the response of the proportional pressure booster valve V to the braking operation.

Since the free piston 24 is formed into the cylindrical shape which is bottomed at the one end and is made to open at the other end or the control piston 23 side thereof with the small-diameter piston portion 23a integrally provided on the one end of the control piston 23 being allowed to fit in the free piston 24 relatively slidably, the axial lengths of those pistons 23, 24 can be set shorter, and the respective piston 23, 24 can movably be supported so as to guarantee the axial movements of those pistons 23, 24, this contributing to the miniaturization of the proportional pressure booster valve V.

Furthermore, since the pair of lip seals 30, 31 is mounted on the outer circumference of the free piston 24 which are brought into a sliding contact with the cap 20 constituting part of the housing 17 of the proportional pressure booster valve V and the drain passage 32 is provided in the cap 20 for allowing the portion between the lip seals 30, 31 to open to the atmospheric pressure, the driver can be warned that abnormal sealing is occurring somewhere around the outer circumference of the free piston 24, and a risk can be avoided in which the whole brake fluid circuit has to be dependent on the single hydraulic system due to the abnormal sealing.

In other words, in the event that one of both the lip seals 30, 31 or for example, the lip seal 31 fails, since the hydraulic pressure is released to the atmospheric pressure in the hydraulic system communicating with the control pressure chamber 27 associated with the failure lip seal 31, the operating stroke being thereby increased in the master cylinder M1, the driver of the vehicle can be made to recognize that a failure occurs. In addition, since the control piston 23 can still be pushed on despite the reduction in hydraulic pressure in one of both the control pressure chambers 25, 27, the boost function can securely be kept functioning properly. In contrast to this feature of the invention, ina case where a single annular seal member is mounted on the outer circumference of the free piston 24, the whole brake fluid circuit has to work through the single hydraulic system due to the failure of the annular seal member, and in the event that a hydraulic failure occurs anywhere along the whole brake fluid circuit, nothing can be helped.

Figure 4:
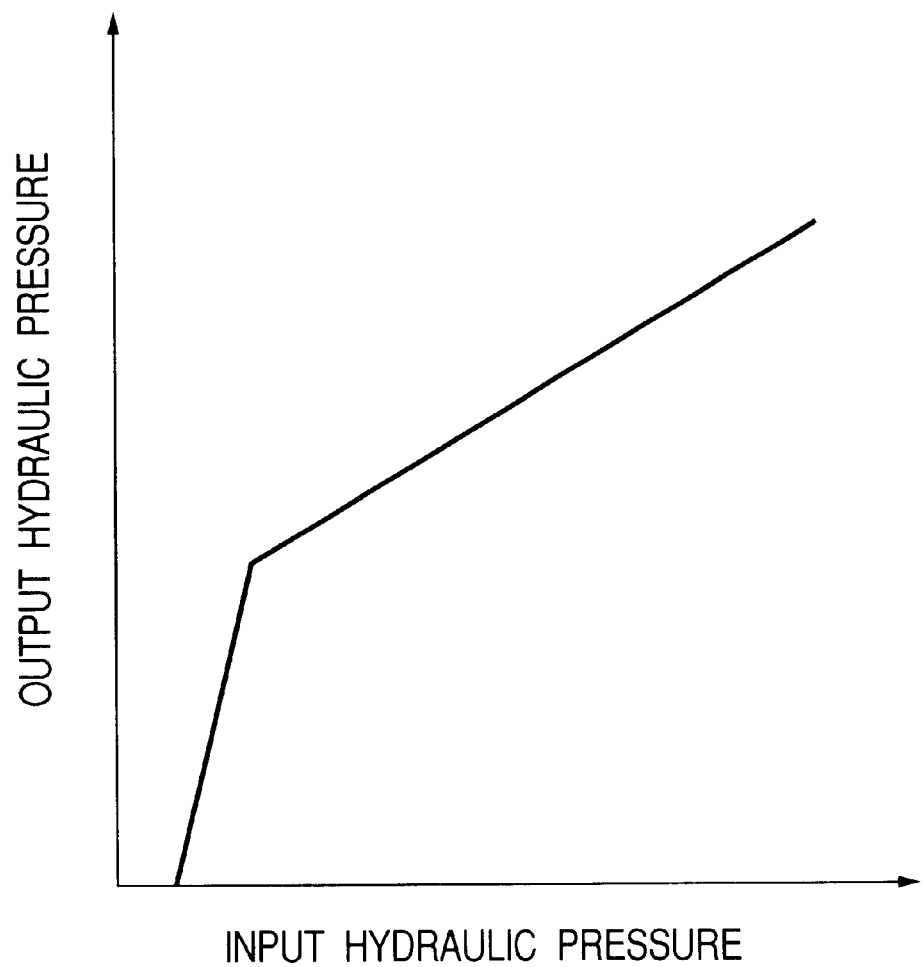
FIG. 4 is a graph showing hydraulic braking properties according to the first embodiment.

The reaction unit 40 of the proportional pressure booster valve V is constituted by the primary reaction piston 37 for transmitting the hydraulic pressure of the boost pressure chamber 44 to the control piston 23 as a reaction force at all times, and the secondary reaction piston 38 for transmitting the hydraulic pressure of the boost pressure chamber 44 to the control piston 23 as a reaction force at all times after the hydraulic pressure in the boost pressure chamber 44 exceeds the set hydraulic pressure. With thus structure, in the initial stage of operation of the master cylinder M1, only the primary reaction piston 37 operates to apply the hydraulic pressure in the boost pressure chamber 44 to the control piston 23 as a reaction force, while after the hydraulic pressure in the boost pressure chamber 44 exceeds the set hydraulic pressure, both the primary and secondary reaction pistons 37, 38 operate to apply the hydraulic pressure in the boost pressure chamber 44 to the control piston 23 as a reaction force. Consequently, as shown in FIG. 4, in the initial stage of operation of the master cylinder M1, an output from the proportional pressure booster valve V or outputs from the secondary master cylinders M2F, M2R can be jumped. Moreover, since no elastic material such as rubber is used, a risk of the hydraulic properties being changed due to change in temperature can be avoided, thereby making it possible to provide stable hydraulic propertied at all times.

Since the primary reaction piston 37 which is connected to the control piston 23 at the one end thereof and faces toward the boost pressure chamber 44 at the other end fits slidably and fluid tightly in the secondary reaction piston 38 which has the abutment face 38b formed at the one end thereof so as to face toward the primary reaction piston 37 to thereby abut against the same piston and faces toward the boost pressure chamber 44 at the other end thereof, the length of the proportional pressure booster valve V along the axial direction of the reaction pistons 37, 38 can be prevented from being increased despite the provision of the primary and secondary reaction pistons 37, 38.

On the other hand, the secondary master cylinders M2F, M2R comprise the cylinder bodies 55, 55' each having the cylinder hole 56 closed at the ends thereof, the working pistons 58 facing at the ends thereof toward the output pressure chambers 59 connected to the associated wheel brakes BFL, BFR; BRF, BRR and the primary input pressure chambers 60 connected to the proportional pressure booster valve V and adapted to slidably fit in the cylinder holes 56 to there by form the annular secondary input pressure chambers 61 between the inner circumference of the cylinder holes 56 and themselves and the return springs 62 for spring biasing the working pistons 58 toward the side where the capacities of the primary pressure chambers 10 are reduced, wherein as the hydraulic pressure in the proportional pressure booster valve increased, the communications between the primary master cylinder M1 and the wheel brakes BFL, BFR; BRL, BRR are cut off by the cut valves 65.

Consequently, the cut valves 65 close as the hydraulic pressure outputted from the proportional pressure booster valve V in response to the operation of the primary master cylinder M1 which occurs in association with an input applied to the brake pedal acts on the primary input pressure chamber 60, whereby boost pressure is applied to the wheel brakes BFL, BFR; BRL, BRR from the output pressure chambers 59 by the working pistons 58 which advances by virtue of the hydraulic pressure in the primary input pressure chambers 60.

Additionally, in the event that boost pressure cannot be obtained at the proportional pressure booster valve V due to the improper operation of the hydraulic pressure source 12, since the cut valves 65 remain opened, the hydraulic pressure outputted from the primary master cylinder M1 is introduced from the secondary input pressure chambers 61 of the secondary master cylinders M2F, M2R into the output pressure chambers 59 via the orifices 73, valve chambers 70 and the valve holes 66, while being introduced from the secondary input pressure chambers 61 into the output pressure chambers 59 via the communication holes 75 . . . and the cup seals 76, whereby the hydraulic pressure so sent to the output pressure chambers 59 is then applied therefrom to the wheel brakes BFL, BFR; BRL, BRR.

Moreover, the cut valve 65 is provided in the working piston 58 so as to cut off the communication between the secondary input pressure chamber 61 and the output pressure chamber 59, and this can help reduce the length of the cylinder bodies 55, 55' or the secondary master cylinders M2F, M2R.

Furthermore, the cylinder hole 56 in each of the secondary master cylinders M2F, M2R is formed into the stepped fashion having the large-diameter hole portion 56a closed at the one end thereof and the small-diameter hole portion 56b which is made to be concentrically continuous with the large-diameter hole portion 56a at the one end and is closed at the other end thereof. The working piston 58 which slidably fits in the cylinder hole 56 so formed integrally comprises the large-diameter piston portion 58a which slidably fits in the large-diameter hole portion 56a to thereby form the output pressure chamber 59 between the closed portion at the one end of the large-diameter hole portion 56a and itself, the small-diameter piston portion 58b which slidably fits in the small-diameter hole portion 56b to thereby form the primary input pressure chamber 60 between the closed portion at the other end of the small-diameter hole portion 58b and itself and the connecting shaft portion 58c which connects the large-diameter piston portion 58a with the small-diameter piston portion 58b to thereby form the annular secondary input pressure chamber 61 between the inner surface of the cylinder hole 56 and itself.

Consequently, the capacity of the secondary input pressure chamber 61 increases as the working piston 58 advances corresponding to the application of the hydraulic pressure outputted from the proportional pressure booster valve V to the primary input pressure chamber 60, the operation stroke of the brake pedal P for operating the primary master cylinder M1 being thus secured.

Furthermore, since the set loads of the valve spring 72 provided on the cut valve 65 in such a manner as to exert the spring force in the valve opening direction and the return spring 62 for biasing the working piston 58 to the side where the capacity of the output pressure chamber 59 is increased are set such that the cut valve 65 closes before the working piston 58 is moved toward the side where the capacity of the output pressure chamber 59 is decreased by virtue of the hydraulic pressure of the primary input pressure chamber 60, the cut valve 65 first closes when the hydraulic pressure is outputted from the proportional pressure booster valve V in response to the operation of the primary master cylinder M1 which is activated by an input to the brake pedal to operate the same, whereby the boost pressure from the proportional pressure booster valve V can efficiently be transmitted to the wheel brakes BFL, BFR; BRL, BRR.

Moreover, the orifice 73 is interposed between the primary master cylinder M1 and the cut valve 65 for throttling the passage of brake fluid, and in the initial stage of operation of the primary master cylinder M1 which is triggered by an input applied to the brake pedal to operate the same, brake fluid trying to flow from the primary master cylinder M1 to the wheel brakes BFL, BFR; BRF, BRR via the cut valve 65 can be held by the orifice 73, with a view to giving priority to the flow of brake fluid from the primary master cylinder M1 to the proportional pressure booster valve V, thereby making it possible to improve the response of the proportional pressure booster valve V.

In particular, the provision of the orifice 73 in the working piston 58 obviates the necessity of providing an extra space where the orifice 73 is mounted, contributing to making compact the overall size of the hydraulic brake booster.

Figure 5:
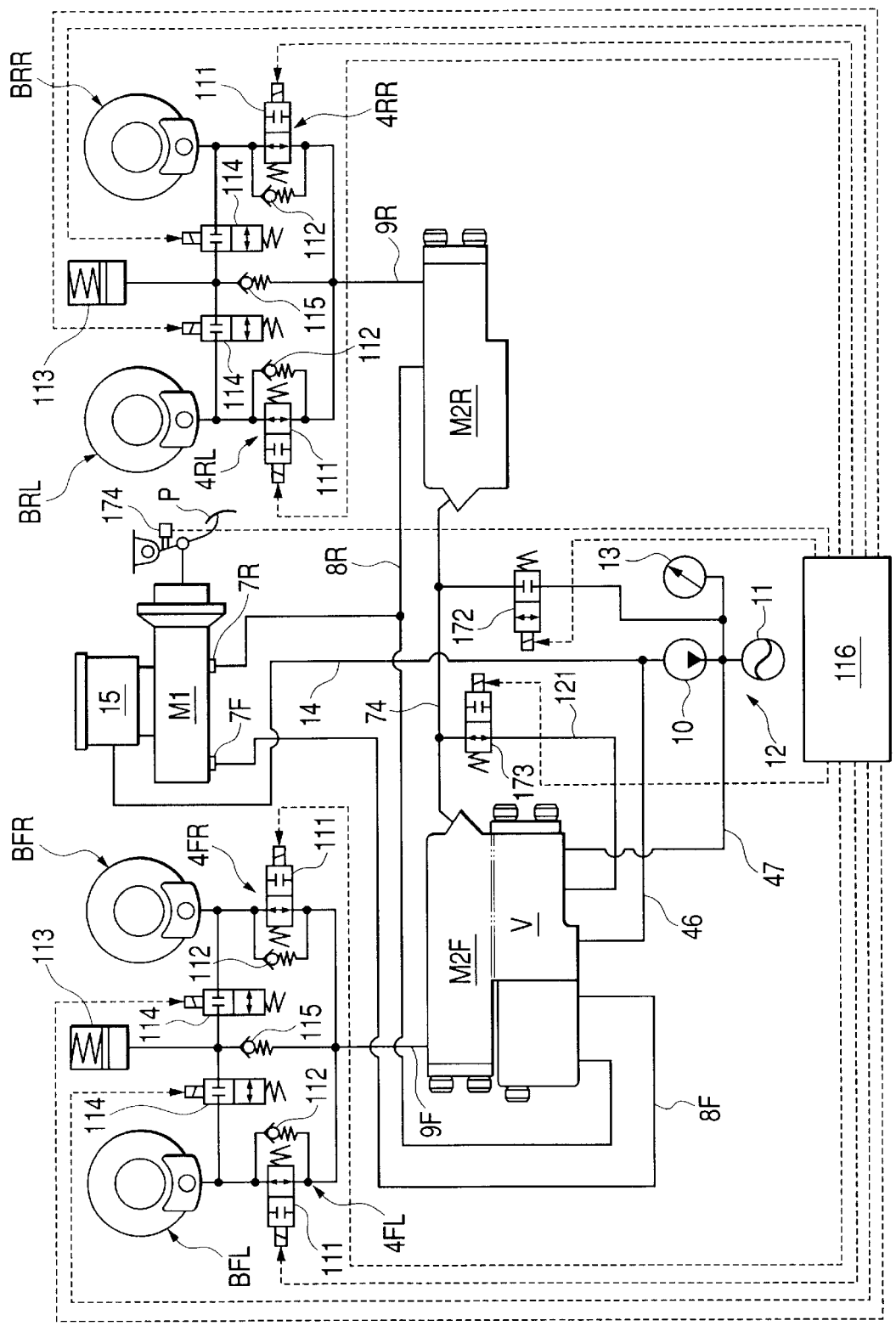
FIG. 5 is a hydraulic circuit diagram of a hydraulic brake booster according to a second embodiment of the invention; and, FIG. 6 is a longitudinal cross-sectional view showing the constructions of a proportional pressure booster valve and a front secondary master cylinder according to the second embodiment.

Next, a description will be given of a hydraulic brake booster according to a second embodiment of the invention with reference to FIG. 5.

Compared to the first embodiment, the second embodiment is different in that a brake booster has pressure regulator valve unit 4FL, 4FR, 4RL and 4RR, and primary and secondary closing valve.

In this embodiment, the pair of front wheel brakes BFL, BFR for braking left and right front wheels are connected to a front output path 9F extending from the front secondary master cylinder M2F via the pressure regulator valve unit 4FL, 4FR, while the pair of rear wheel brakes BRL, BRR for braking left and right rear wheels are connected to a rear output path 9R extending from the rear secondary master cylinder M2R via the pressure regulator valve unit 4RL, 4RR.

The pressure regulator valve unit 4FL comprises a normally open electromagnetic valve 11 provided between the front output path 9F and the left front wheel brake BFL, a one-way valve 112 connected in parallel to the normally open electromagnetic valve 111, a pressure reducing reservoir 113, a normally closed electromagnetic valve 114 provided between the left front wheel brake BFL and the pressure reducing reservoir 113, and a one-way valve 115 for allowing brake fluid to return from the pressure reducing reservoir 113 to the front output path 9F side.

In addition, the pressure regulator valve unit 4FR on the right front wheel brake BFR comprises, as with the pressure regulator valve unit 4FL, a normally open electromagnetic valve 111, a one-way valve 112, the pressure reducing reservoir 113, a normally closed electromagnetic valve 114 and the one-way valve 115, the pressure reducing reservoir 113 and the one-way valve 115 being used commonly between the two pressure regulator valve unit 4FL, 4FR.

As with the pressure regulator valve unit 4FL, 4FR just described above, the pressure regulator valve unit 4RL, 4RR corresponding to the left and right rear wheel brakes BRL, BRR comprise normally open electro magnetic valves 111, 111 provided between the rear output path 9R and the left and right rear wheel brakes 4RL, 4RR, respectively, one-way valves 112, 112 connected in parallel to the normally open electromagnetic valves 111, 111, a pressure reducing reservoir 113 for use in common to both the pressure regulator valve unit 4RL, 4RR, normally closed electromagnetic valves 114, 114 provided between the left and right rear wheel brakes BRL, BRR and the pressure reducing reservoir 113, respectively, and a one-way valve 115 for use in common to both the pressure regulator valve unit 4RL, 4RR.

The magnetization and demagnetization of the normally open electromagnetic valves 111 . . . and the normally closed electromagnetic valves 114 . . . in the pressure regulator valve unit 4FL, 4FR, 4RL, 4RR is controlled by a control unit 116. The control unit 116 switches over a boost mode in which the normally open electromagnetic valves 111 . . . are opened, while the normally closed electromagnetic valves 114 . . . are closed, a pressure reducing mode in which the normally open electromagnetic valves 111 . . . are closed, while the normally closed valves 114 . . . are opened and a hold mode in which both the normally open electro magnetic valves 111 . . . and the normally closed electromagnetic valves 114 . . . are closed, whereby the operations of the respective pressure regulator valve unit 4FL, 4FR, 4RL, 4RR are controlled to be switched over, this allowing the hydraulic pressure outputted from the secondary master cylinders M2F, M2R to be regulated for application to the respective wheel brakes BFL, BFR, BRL, BRR.

In this embodiment, the hydraulic pressure source 12 is connected to the communication line 74 via a primary closing valve 172. Namely, the single primary closing valve 172 corresponding to the pair of secondary master cylinders M2F, M2R and the single hydraulic pressure source 12 is provided between the primary input pressure chambers 60 . . . of both the secondary master cylinders M2F, M2R and the hydraulic pressure source 12. Moreover, the primary closing valve 172 can be closed independently of the operation of the primary master cylinder M1, and for example, a normally closed electromagnetic valve may be used as the primary closing valve.

In addition, a secondary closing valve 173 corresponding to the pair of secondary master cylinders M2F, M2R and the single hydraulic pressure source 12 at an intermediate position along a path from the primary input pressure chambers 60 . . . of the two secondary master cylinders M2F, M2R to the reservoir 15 via the boost pressure chamber 44 of the proportional pressure booster valves V and the outlet valve 51, that is, in this embodiment, between the communication line 74 communicating with the primary input pressure chambers 60 . . . and a hydraulic pressure path 121 communicating with the boost pressure chamber 44. Moreover, the secondary closing valve 173 can be closed independently of the operation of the primary master cylinder M1, and a normally open electromagnetic valve may be used for the secondary closing valve.

The closing operation of the primary and secondary closing valves 172, 173 is controlled by the control unit 116, and the control unit 116 switches over between a non-operation mode in which the primary closing valve 172 is closed, while the secondary closing valve 173 is open, and an operation mode in which the primary closing valve 172 is open, while the secondary closing valve 173 is closed, depending upon the braking or turning condition of the vehicle.

Moreover, inputted into the control unit 116 is a detection signal of a brake switch 174 functioning as a detection unit for detecting the operation of the primary master cylinder M1, and when the operation of the primary master cylinder M1 is detected by the brake switch 174 in a state in which the primary closing valve 172 is open, while the secondary closing valve 173 is closed, the control unit 116 closes the primary closing valve 72 and opens the secondary closing valve 173.

Figure 6:
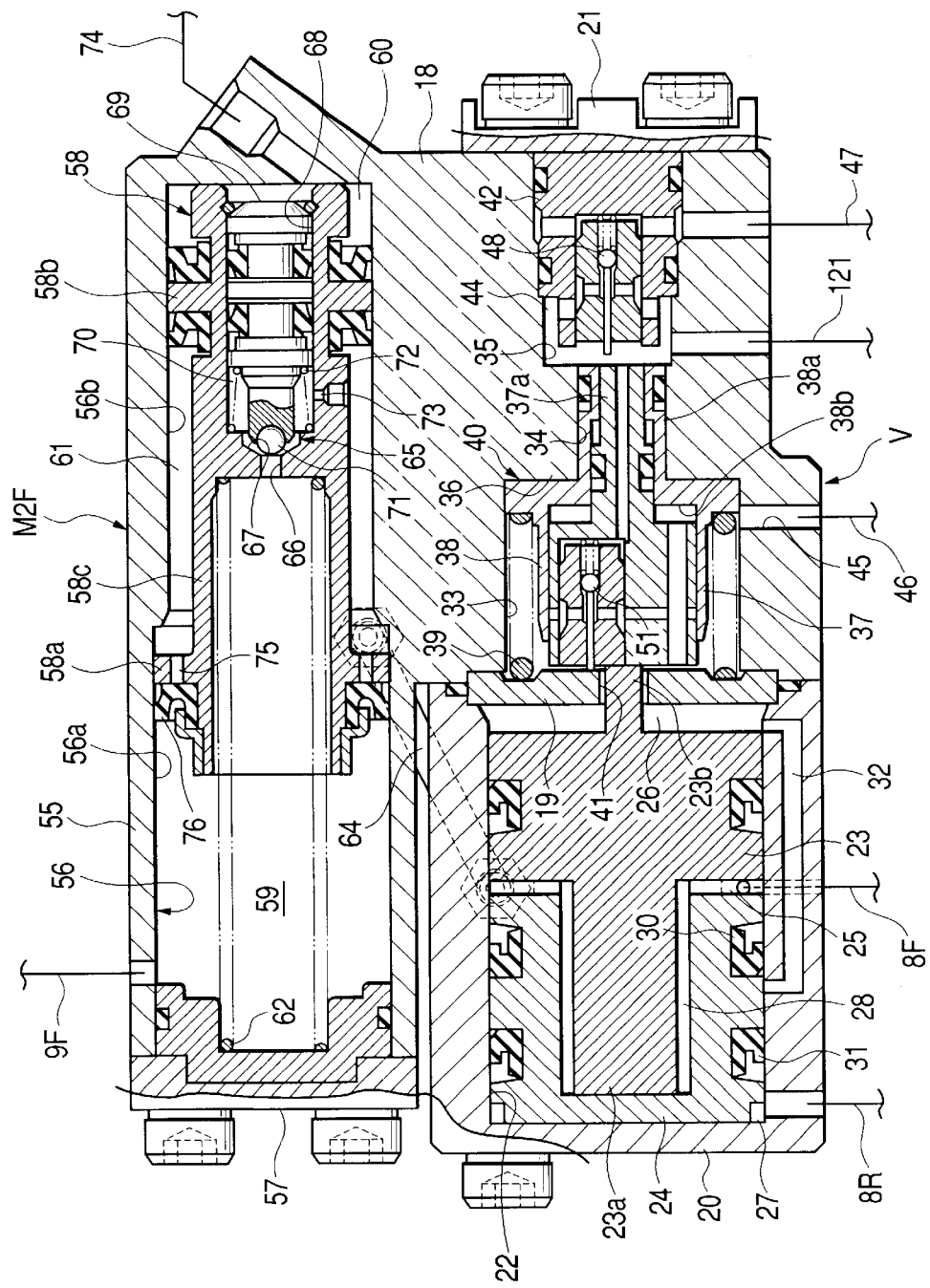

As shown in FIG. 6, the front secondary master cylinder M2F and the proportional pressure booster valve V are basically constructed identical with that of the first embodiment except that the proportional pressure booster valve V has the hydraulic pressure path 121 communicating the secondary closing valve 173, and there is no communication path 65 formed between the booster pressure chamber 44 and the primary input pressure chamber 60. Accordingly, a detailed description of the front secondary master cylinders M2F and the proportional pressure booster valve V will be omitted here. Further, as well as the first embodiment, since the rear secondary master cylinder M2R is basically constructed identical with the front secondary master cylinder M2F, a detailed description of the rear secondary master cylinder M2R will be also omitted.

Next, the operation of the second embodiment will be described.

<Normal Brakes Condition>

Normally, the respective pressure regulator valve unit 4FL, 4FR, 4RL, 4RR are held in the boost mode in which the normally open electromagnetic valves 111 . . . are open, while the normally closed electromagnetic valves 114 . . . are closed, and the primary and secondary closing valves 172, 173 are held in the non-operation mode in which the secondary closing valve 173 is open, while the primary closing valve 172 is closed.

Since the operation of the proportional pressure booster valve V and the transmission of hydraulic pressure are basically identical to that of the first embodiment, a description thereof will be omitted here.

<Anti-lock Braking Control>

Assuming that the left front wheel is nearly locked on braking, recognizing the occurrence of the situation, the control unit 116 switches over the pressure regulator valve unit 4FL from the boost mode to the pressure reducing mode, and closes the normally open electromagnetic valve 111 of the pressure regulator valve unit 4FL, while opening the normally closed electromagnetic valve 114. As a result, the hydraulic pressure is allowed to leak from the left front wheel brake BFL to the pressure reducing reservoir 113 to thereby reduce the brake pressure at the left front wheel brake BFL, the left front wheel being thereby prevented from being locked.

When the brake pressure at the left front wheel brake BFL becomes normal, the control unit 116 then switches over the pressure regulator valve unit 4FL from the pressure reducing mode to the hold mode to thereby hold the brake pressure at the left front wheel brake BFL. In addition, the brake pressure needs to be restored, the pressure regulator valve unit 4FL is restored to the boost mode from the hold mode. As a result, the hydraulic pressure outputted from the front secondary master cylinder is supplied to the left front wheel brake BFL to thereby restore the brake pressure thereat. Thus, the left front wheel brake BFL can be operated efficiently without locking the left front wheel.

<Brake Assist Condition>

In depressing the brake pedal P, when the depressing speed or pedal effort exceeds a predetermined value, the control unit 116 determines the situation as an emergency braking situation and switches over the primary and secondary closing valves 172, 173 to put them in the operation mode. Namely, the primary closing valve 172 is opened at the same time as the secondary closing valve 173 is closed. As a result, the hydraulic pressure in the hydraulic pressure source 12 is applied to the primary input pressure chambers 60 . . . of the secondary master cylinders M2F, M2R, and a hydraulic pressure higher than the hydraulic pressure in the hydraulic pressure source 12 is then outputted from the secondary master cylinders M2F, M2R, whereby the respective wheel brakes BFL, BFR, BRL, BRR are applied quickly and strongly.

As this occurs, since the secondary closing valve 173 is closed while the primary closing valve 172 is open, the application of an excessive reaction force from the reaction unit 40 to the control piston 23 is avoided, which would otherwise occur as the high hydraulic pressure is introduced from the primary input pressure chambers 60 . . . into the boost pressure chamber 44 of the proportional booster valve V. Further, even if the outlet valve 51 is put in the open state, the hydraulic pressure outputted from the hydraulic pressure source 12 is prevented from escaping into the reservoir 15 via the boost pressure chambers 44 and the outlet valves 51.

Moreover, since the secondary closing valve 173 is provided between the boost pressure chamber 44 of the proportional booster valve V and the primary input pressure chambers 60 . . . , a differential pressure between the hydraulic pressure outputted from the hydraulic pressure source 12 and the hydraulic pressure outputted from the proportional booster valve V is then applied to the valve body of the secondary closing valve 173 in the valve opening direction when it is closed, this making smaller a force required to open the secondary closing valve 173, thereby making it possible to miniaturize the secondary closing valve 173.

Even when the brakes are applied with power assist as described above, if the respective wheels are about to be locked, it goes without saying that recognizing the occurrence of the situation, the control unit 16 controls, as described above, the pressure regulator valve unit of the pressure regulator valve unit 4FL, 4FR, 4RL, 4RR which corresponds to the wheel which is about to be locked, to thereby perform the anti-lock braking control on the wheel.

<Stability Control>

In the event that the steered angle and yaw rate of the vehicle do not correspond to each other while the vehicle turns without braking, or due to transverse wind or road surface conditions, the control unit 16 determines the situation as an over-steer or under-steer from magnitudes of values therefor, and put the primary and secondary closing valves 172, 173 in the operation mode, controlling the respective pressure regulator valve unit 4FL, 4FR, 4RL, 4RR, whereby the stability of the vehicle can be controlled. This stability control also can be carried out even when the primary and secondary closing valves 172, 173 are in the non-operation mode, and in this case, the stability of the vehicle can be controlled by controlling the respective pressure regulator valve unit 4FL, 4FR, 4RL, 4RR.

<Automatic Brake Control>

In order to maintain a proper distance to a vehicle running ahead, the brakes can be applied automatically while no brakes are applied by the driver. When it determines that automatic braking is required, the control unit 116 puts the primary and secondary closing valves 172, 173 in the operation mode, whereby the hydraulic pressure outputted from the hydraulic pressure source 12 is applied directly to the primary input pressure chambers 60 . . . of the secondary master cylinders M2F, M2R to thereby activate the secondary master cylinders M2F, M2R, the hydraulic pressure outputted from the secondary master cylinders M2F, M2R being thus transmitted to the respective wheel brakes BFL, BFR, BRL, BRR for use thereat.

As this occurs, the boost pressure chamber 44 of the proportional booster valves V is communicated with the reservoir 15 via the outlet valve 51, but the hydraulic pressure of the hydraulic pressure source 12 is prevented from escaping to the reservoir 15 by closing the secondary closing valve 173.

As the brake switch 174 detects that the driver has performed a braking operation which has triggered the operation of the primary master cylinder M1 when automatic braking is being effected as described above or the stability control is being performed, the control unit 116 switches over the primary and secondary closing valves 172, 173 to the non-operation mode, this restoring the state in which the hydraulic pressure outputted from the proportional booster valve V is applied to the secondary master cylinders M2F, M2R.

<Hydraulic Failure at Hydraulic Pressure Source 12>

Should a hydraulic failure occur at the hydraulic pressure source 12, disabling the hydraulic pressure in the boost pressure chamber 44 from being increased, the working pistons 58 of the secondary master cylinders M2F, M2R are not able to advance. Therefore, the hydraulic pressure supplied from the primary master cylinder M1 into the secondary input pressure chambers 61 of the respective secondary master cylinders M2F, M2R is transmitted to the output pressure chambers 59 by passing through the sliding holes 68 which are open, whereby the front wheel brakes BFL, BFR and the rear wheel brakes BRL, BRR can securely be operated by virtue of the hydraulic pressure from the primary master cylinder M1.

<Brake Release Condition>

When the input operating to the brake pedal P is released to thereby restore the primary master cylinder M1 to the non-operation state with a view to releasing the brakes applied, since the inlet valve 48 is closed, while the outlet valve 51 is opened in the proportional booster valve V as the control pistons 23 retreat in association with reduction in pressure in the control pressure chambers 25, 27, the hydraulic pressure of the boost pressure chamber 44 is discharged to the reservoir 15 through the outlet valves 51, and in conjunction with this, in the secondary master cylinders M2F, M2R, the working pistons 58 are retreated by virtue of the biasing force of the return springs 62 as the hydraulic pressure in the primary input pressure chambers 60 decreases, whereby the hydraulic pressure in the output pressure chambers 59 decreases. Thus, the braking operation of the front wheel brakes BFL, BFR and the rear wheel brakes BRL, BRR is released.

Thus, while the embodiments of the invention has been described heretofore, the invention is not limited to the described embodiments but may be modified with respect to design in various ways without departing from the sprit and scope of the invention.

As has been described above, according to the first aspect of the invention, since the plurality of secondary master cylinders are operated by virtue of the boost pressure outputted from the single proportional pressure booster valve, the respective secondary master cylinders can be boost operated simultaneously at all times to thereby allow all the wheel brakes to operate simultaneously. This allows the single proportional pressure booster valve to suffice for the designed operation of the secondary master cylinders to thereby reduce the number of components used in the booster, which results in a simple construction, thereby contributing to the reduction in production cost. Moreover, even if a hydraulic failure occurs somewhere along the hydraulic system communicating with either of the primary and secondary pressure chambers for some reason, the control piston can still be pushed on, thereby making it possible to maintain the boost function of the proportional pressure booster valve.

In addition, according to the second aspect of the invention, the hydraulic pressure outputted from the primary master cylinder can be applied to the control piston in the proportional pressure booster valve to thereby improve the response of the proportional pressure booster valve to the braking operation.

According to the third aspect of the invention, the control piston and the free piston can movably be supported so as to guarantee the axial movements thereof, while the axial lengths thereof are set shorter, this contributing to the miniaturization of the proportional pressure booster valve.

Furthermore, according to the fourth aspect of the invention, the driver of the vehicle is allowed to recognize that an abnormal situation has occurred or is occurring somewhere around the outer circumference of the free piston, and the risk can be avoided in which the whole brake fluid circuit has to operate through the single hydraulic circuit due to the aforesaid abnormal situation.

Further, according to the fifth aspect of the invention, the output from the proportional booster valve can be made to jump in the initial operating stage of the primary master cylinder, and the variation in the pressure characteristics due to temperatures can be avoided to thereby obtain stable pressure characteristics at all times.

In addition, according to the sixth aspect of the invention, despite the primary and secondary reaction pistons being disposed, the increase in the length of the proportional booster valve along the axial direction of the reaction pistons can be suppressed.

What is claimed is:

1. A hydraulic brake booster, comprising:
    a primary tandem master cylinder having a pair of output ports for outputting a hydraulic pressure in response to an input for the braking operation;
    a hydraulic pressure source for outputting a hydraulic pressure which is higher than the hydraulic pressure outputted from said primary master cylinder;
    a plurality of secondary master cylinders each having an input pressure chamber and an output pressure chamber connected to wheel brakes for outputting a hydraulic pressure corresponding to the hydraulic pressure outputted from said input pressure chamber; and
    a proportional pressure booster valve for outputting a boost pressure corresponding to the hydraulic pressure outputted from said primary master cylinder while drawing the hydraulic pressure from said hydraulic pressure source, said proportional pressure booster valve comprising:
        a control piston facing at one end thereof with a primary control pressure chamber to which one of both said output ports is connected;
        a free piston facing at both ends thereof with a secondary control pressure chamber to which the other of both said output ports is connected and said primary control pressure chamber, respectively, said free piston being adapted to directly apply a pressing force to the one end of said control piston when the hydraulic pressure of said primary control pressure chamber decreases below the hydraulic pressure of said secondary control pressure chamber;
        a reaction unit for applying to the other end of said control piston a reaction force corresponding to a hydraulic pressure of a boost pressure chamber connected in common to said plurality of input pressure chambers, and
        a valve unit adapted to be activated in accordance with the movement of said control piston in an axial direction so as to introduce into said boost pressure chamber, a hydraulic pressure proportional to the hydraulic pressure outputted from said primary master cylinder while drawing the hydraulic pressure from said hydraulic pressure source.

2. The hydraulic brake booster according to claim 1, wherein, of both said output ports of said primary master cylinder, the output port which is adapted to output at an earlier timing is connected to said primary control pressure chamber.

3. The hydraulic brake booster according to claim 1, wherein said free piston has a bottomed cylindrical shape constructed so as to be bottomed at one end thereof and open at the other end thereof which faces with said control piston, and
    wherein said control piston includes a small-diameter piston portion integrally formed at the one end thereof and being relatively slidably fitted into said free piston.

4. The hydraulic brake booster according to claim 1, wherein said proportional pressure booster valve further comprises:
    a housing adapted to slidably fit said free piston; and
    a pair of annular seal members mounted on an outer circumference of said free piston in such a manner as to be brought into a sliding contact with said housing,
    wherein a drain passage is formed in said housing for opening a space between said seal members to the atmospheric.

5. The hydraulic brake booster according to claim 1, wherein said reaction unit comprises:
   a primary reaction piston transmitting at all times to said control piston a reaction force corresponding to a hydraulic pressure of a boost pressure chamber connected to said input pressure chamber; and
   a secondary reaction piston transmitting to said control piston a reaction force corresponding to the hydraulic pressure of said boost pressure chamber when the hydraulic pressure of said boost pressure chamber exceeds a set hydraulic pressure.

6. The hydraulic brake booster according to claim 1, wherein said valve unit comprises:
   an inlet valve interposed between said boost pressure chamber and said hydraulic pressure source such that said inlet valve is opened as said control piston moves toward a side where the capacity of said boost pressure chamber is reduced in response to a change in the hydraulic pressure of said first and second control pressure chambers; and
   an outlet valve interposed between said boost pressure chamber and said reservoir such that said outlet valve is closed as said control piston moves toward the side where the capacity of said boost pressure chamber is reduced.

7. The hydraulic brake booster according to claim 6, further comprising:
   a pressure regulator valve unit provided between said output pressure chamber and the wheel brake, for regulating the hydraulic pressure of said output pressure chamber;
   a primary closing valve interposed between said hydraulic pressure source and said input pressure chamber; and
   a secondary closing valve provided at an intermediate position along a path extending from said input pressure chamber to said reservoir via said booster pressure chamber and said outlet valve such that said secondary closing valve opens when said primary closing valve closes, while said secondary closing valve closes when said primary closing valve opens.

8. The hydraulic brake booster according to claim 7, wherein said secondary closing valve are interposed between said boost pressure chamber and said input pressure chambers.

9. The hydraulic brake booster according to claim 7, wherein a single number of said primary and secondary closing valves is provided for said plurality of secondary master cylinders and said single hydraulic pressure source.

10. The hydraulic brake booster according to claim 7, wherein said or primary and secondary closing valves open and close independently of the operation of said primary master cylinder.

11. The hydraulic brake booster according to claim 10, further comprising:
   a detecting unit for detecting the operation of said primary master cylinder; and
   a control unit for controlling said primary and secondary closing valves such that said primary closing valve closes, while said secondary closing valve opens when said detecting unit detects the operation of said primary master cylinder in a state in which said primary closing valve are open, while said secondary closing valve are closed.

12. A hydraulic brake booster, comprising:
   a primary master cylinder for outputting a hydraulic pressure in response to an input for the braking operation;
   a hydraulic pressure source for outputting a hydraulic pressure which is higher than the hydraulic pressure outputted from said primary master cylinder;
   a secondary master cylinder having an input pressure chamber and an output pressure chamber connected to wheel brakes for outputting a hydraulic pressure corresponding to the hydraulic pressure outputted from said input pressure chamber; and
   a proportional pressure booster valve for outputting a boost pressure corresponding to the hydraulic pressure outputted from said primary master cylinder while drawing the hydraulic pressure from said hydraulic pressure source, said proportional pressure booster valve comprising:
      a control piston facing at one end thereof with a control pressure chamber to which the hydraulic pressure outputted from said primary master cylinder is inputted;
      a primary reaction piston transmitting at all times to said control piston a reaction force corresponding to a hydraulic pressure of a boost pressure chamber connected to said input pressure chamber;
      a secondary reaction piston transmitting to said control piston a reaction force corresponding to the hydraulic pressure of said boost pressure chamber when the hydraulic pressure of said boost pressure chamber exceeds a set hydraulic pressure; and
      a valve unit adapted to be activated in accordance with the movement of said control piston in an axial direction so as to introduce into said boost pressure chamber a hydraulic pressure proportional to the hydraulic pressure of said control pressure chamber while drawing the hydraulic pressure from said hydraulic pressure source.

13. The hydraulic brake booster according to claim 12, wherein said primary reaction piston is abutted to said control piston at one end thereof and faces with said boost pressure chamber at the other end thereof,
   said secondary reaction piston has at one end thereof an abutment face adapted to be brought into abutment with said primary reaction piston and faces with said boost pressure chamber at the other end thereof, and
   wherein said primary reaction piston is fluid-tightly and relatively slidably fitted into said secondary reaction piston.

14. The hydraulic brake booster according to claim 12, wherein said valve unit comprises:
   an inlet valve interposed between said boost pressure chamber and said hydraulic pressure source such that said inlet valve is opened as said control piston moves toward the side where the capacity of said boost pressure chamber is reduced in response to a change in the hydraulic pressure of said control pressure chamber; and
   an outlet valve interposed between said boost pressure chamber and said reservoir such that said outlet valve is closed as said control piston moves toward a side where the capacity of said boost pressure chamber is reduced.

15. The hydraulic brake booster according to claim 14, further comprising:
   a pressure regulator valve unit provided between said output pressure chamber and the wheel brake, for regulating the hydraulic pressure of said output pressure chamber;
   a primary closing valve interposed between said hydraulic pressure source and said input pressure chamber; and a secondary closing valve provided at an intermediate position along a path extending from said input pressure chamber to said reservoir via said booster pressure chamber and said outlet valve such that said secondary closing valve opens when said primary closing valve closes, while said secondary closing valve closes when said primary closing valve opens.

16. The hydraulic brake booster according to claim 15, wherein said secondary closing valve are interposed between said boost pressure chamber and said input pressure chambers.

17. The hydraulic brake booster according to claim 15, wherein a single number of said primary and secondary closing valves is provided for said plurality of secondary master cylinders and said single hydraulic pressure source.

18. The hydraulic brake booster according to claim 15, wherein said primary and secondary closing valves open and close independently of the operation of said primary master cylinder.

19. The hydraulic brake booster according to claim 15, further comprising:

a detecting unit for detecting the operation of said primary master cylinder; and a control unit for controlling said primary and secondary closing valves such that said primary closing valve closes, while said secondary closing valve opens when said detecting unit detects the operation of said primary master cylinder in a state in which said primary closing valve are open, while said secondary closing valve are closed.

20. The hydraulic brake booster according to claim 12, further comprising:

a pressure regulator valve unit provided between said output pressure chamber and a wheel brake, for regulating the hydraulic pressure of said output pressure chamber;

a primary closing valve interposed between said hydraulic pressure source and said input pressure chamber; and a secondary closing valve provided at an intermediate position along a path extending from said input pressure chamber to said reservoir via said booster pressure chamber and a part of said valve unit such that said secondary closing valve opens when said primary closing valve closes, while said secondary closing valve closes when said primary closing valve opens.

* * * * *